No. 620,781. Patented Mar. 7, 1899.
P. W. JEPPESEN.
DROP ACTUATING MECHANISM FOR SEED PLANTERS.
(Application filed Sept. 1, 1898.)
(No Model.)
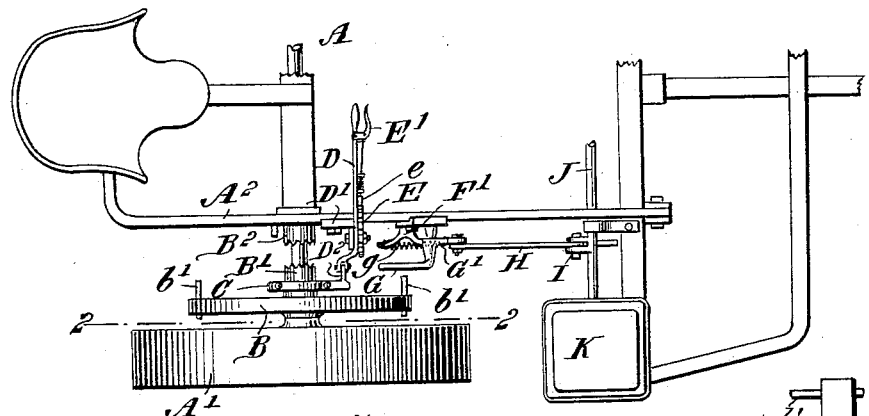
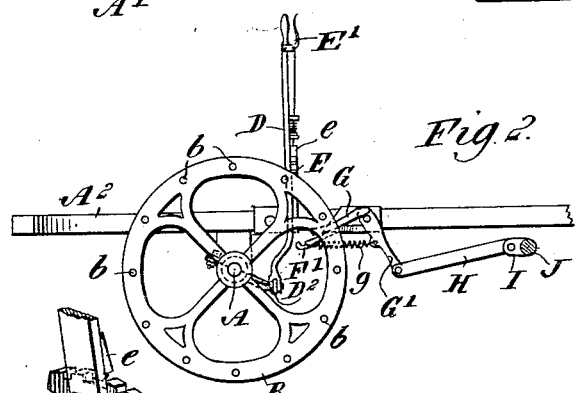
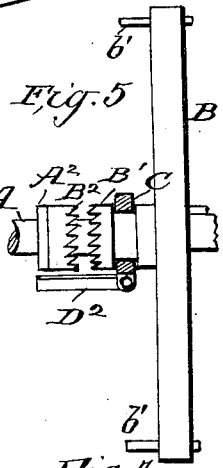
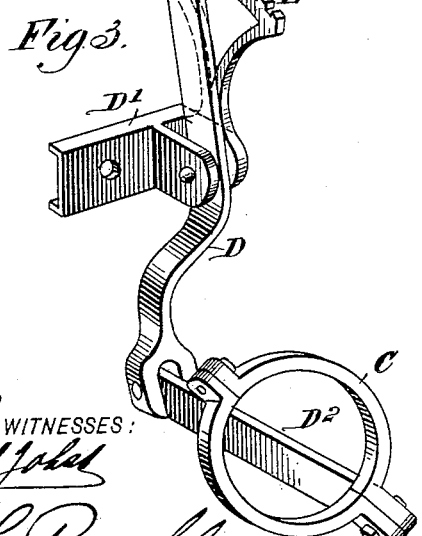
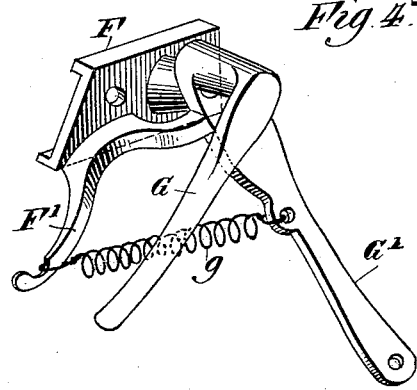
WITNESSES:
INVENTOR
P. W. Jeppesen
BY
ATTORNEYS.

UNITED STATES PATENT OFFICE.

PETER WILHELM JEPPESEN, OF BLOOMFIELD, NEBRASKA.

DROP-ACTUATING MECHANISM FOR SEED-PLANTERS.

SPECIFICATION forming part of Letters Patent No. 620,781, dated March 7, 1899.

Application filed September 1, 1898. Serial No. 690,006. (No model.)

*To all whom it may concern:*

Be it known that I, PETER WILHELM JEPPESEN, of Bloomfield, in the county of Knox and State of Nebraska, have invented a new and Improved Drop-Actuating Mechanism for Seed-Planters, of which the following is a full, clear, and exact description.

My invention relates to an improvement in means for actuating the dropping mechanism of planters of a class resembling the corn-planters.

My invention comprises the novel features hereinafter described and claimed.

Reference is to be had to the accompanying drawings, forming a part of this specification, in which similar characters of reference indicate corresponding parts in all the figures.

Figure 1 is a top plan view of one side of a corn-planter, showing my device attached thereto. Fig. 2 is a side elevation and section taken upon the line 2 2 of Fig. 1. Fig. 3 is a perspective view showing the means for shifting the actuating-wheel, and Fig. 4 is a perspective view showing the lever which is engaged by the actuating-wheel and which operates the drop mechanism. Fig. 5 is an elevation of the clutch mechanism by means of which the wheel B may be locked to turn with the shaft.

My device is intended for use in connection with corn-planters and other planters similar in construction and is designed to actuate the dropping mechanism by the rotation of the wheels which carry the planter. The planter may be any one of the usual constructions. The drop mechanism may also be of any ordinary construction in which the mechanism may be operated by the reciprocation of a bar. Consequently these parts of the planter have not been shown in detail.

In the drawings, A represents the main axle of the planter, A' one of the wheels, and A² a portion of the frame. The axle A is to be secured to the wheel, so as to turn therewith. Mounted upon the axle A is the actuating-wheel B. This wheel is mounted to turn with the axle and to slide freely thereon, being secured by a key and feather or similar mechanism. This wheel has a series of holes $b$ in its periphery and extending parallel with the axle. These holes are adapted to receive pins $b'$, which project laterally and are the direct means for actuating the dropping mechanism. As shown in Fig. 2, a large number of these holes are provided. Not all of them may be used at once. As many pins may be inserted as desired, the number of pins corresponding with the frequency it is desired to drop the seed.

Instead of mounting the wheel B so as to turn at all times with the shaft the wheel may be mounted loosely upon the shaft and be given rotation at the time desired by means of clutch mechanism such as shown at B' and B². The hub B' is provided with notches in its end adapted to engage similar notches in the end of the collar B², the latter being secured to the shaft and rotating therewith. In either case the hub B' is provided with a groove, which receives the ring C. The ring C is connected to a lever D by a link D². The lever D is pivoted upon the frame in any convenient manner. As herein shown, this lever is pivoted directly upon a block D', and the latter is secured to the frame by a bolt or other convenient means. This latter construction is one which will adapt the parts for attachment to a planter already constructed. The block D' has an upwardly-extending arm provided with a toothed segment E, adapted to be engaged by a catch $e$, mounted upon the lever D and controlled by a handle E' in the usual manner. By this means the wheel B may be shifted into its operative position or so as to throw it out of operation. In the position shown in Fig. 1 the wheel B is in its inoperative position.

Mounted upon the frame is a bell-crank lever, which consists of the two arms G and G'. This frame is so located that the arm G will normally be held in the path of the pins $b'$. These pins as they engage the levers will cause a reciprocation thereof. The arm G' is connected by a link H to a drop mechanism, so that the drop mechanism is actuated at each time the arm G is engaged by one of the pins $b$. The drop mechanism shown in Fig. 1 is of that sort in which a shaft J extends from one of the seed-holding boxes K across to the similar box on the opposite side of the planter, and the seed-dropping mechanism is actuated by the oscillation of the shaft J. For this purpose the shaft J is provided with an arm I, to which the link H is attached. The form of seed-dropping mechanism is, however, immaterial. The connection of my actuating mechanism thereto will depend upon the structure of the seed-dropping mechanism. To return the lever G and G' to said operative position, a spring g is used, which is attached at one end to the lever G' and at the other end to an arm F', which is secured to the block F. One end of the arm F' also acts as a stop to engage the lever G' and prevent its returning farther than desired.

This device, as herein shown, may be attached to any planter already constructed, as well as be applied to planters during the process of construction. It is a simple device, under the control of the driver, and one which may be readily adjusted for dropping at very short or at long intervals or at any convenient point between. It will also drop the seed at regular intervals. It is simple, cheap to manufacture, and is at all times under the eye of the driver, so that he can watch it and observe whether it is working properly or not.

Having thus fully described my invention, I claim as new and desire to secure by Letters Patent—

1. A drop-actuating attachment for seed-planters of the class described, comprising a wheel mounted to turn with the planter-axle and having side extending pins and a hub provided with a circumferential groove, two attachable semicircular bands lying within the groove, a link secured to one end of the bands, two flanged base-blocks adapted to be secured to the planter-frame, a lever pivoted upon one base-block and connected at one end with the link whereby the wheel may be moved lengthwise of the axle, a lever pivoted upon the other base-block and having one arm extending into the path of the pins, and a link connecting said last-named lever with the dropping mechanism, substantially as described.

2. A drop-actuating attachment for seed-planters of the class described, comprising a wheel mounted to turn with and slide upon a planter-axle and having side extending pins, a lever pivoted to the frame and connected with said wheel to move it lengthwise the axle, a block provided with means for securing it to the frame, and having a spring holding-arm ranging lengthwise of the block, one end of which arm acts as a lever-stop, a bell-crank lever pivoted to the block and having one arm normally engaging said stop and in the path of the pins on the wheel, and the other arm offset therefrom, a spring connecting the first-named arm of this lever with the arm on the block, and connections from the other lever-arm to the drop mechanism, substantially as described.

3. A drop-actuating attachment for seed-planters of the class described, comprising a wheel mounted to turn with the planter-axle and having side extending pins, and a hub provided with a circumferential groove, two attachable semicircular bands lying within the groove, a link secured to one end of the bands, a base-block provided with means for securing it to the frame and having an arm terminating in a notched segment, a lever pivoted upon this block and having a catch for engaging the notched segment and connected with the link whereby the wheel may be moved lengthwise the axle, a second base-block securable to the frame, a lever pivoted upon this base-block and having one arm in the path of the pins on the wheel, a spring for returning said lever and connections from said lever to the drop mechanism, substantially as described.

4. In dropping devices, the combination of drop mechanism and actuating devices therefor, the actuating devices including a two-arm lever, the arms of which are at an angle to each other and in different planes, means for mounting the lever at the angle of the arms, a base-block having an arm, and a spring connected with the last-mentioned arm and one arm of the lever, one arm of the lever being acted on by the actuating devices and the other having connection with the drop devices, substantially as described.

PETER WILHELM JEPPESEN.

Witnesses:
S. SAUNDERS,
L. G. CROSBY.